F. DECKER.
Seed Harvester.
No. 105,920. Patented Aug. 2, 1870.
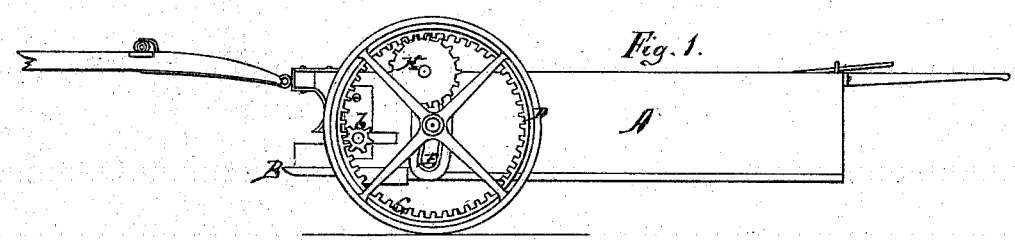
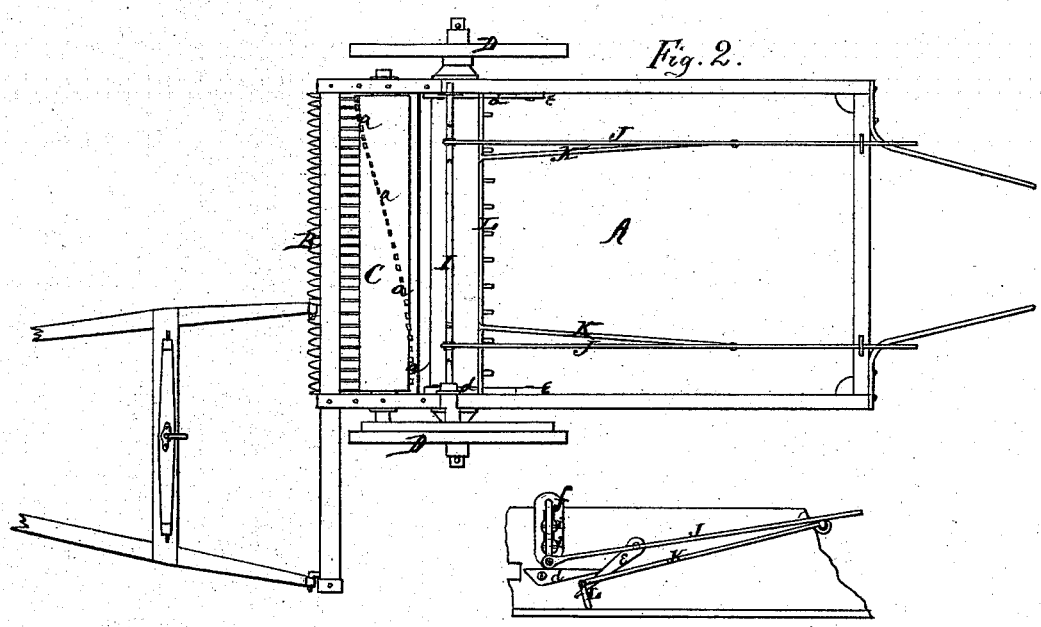
Witnesses:
Chas. Jacobs.
J. V. White.
Inventor:
Fred. Decker.
Per
J. H. Alexander
Atty.

United States Patent Office.

FREDERICKE DECKER, OF DELAWARE, OHIO.

Letters Patent No. 105,920, dated August 2, 1870.

---

IMPROVEMENT IN SEED-HARVESTERS.

---

The Schedule referred to in these Letters Patent and making part of the same.

---

*To all whom it may concern:*

Be it known that I, FREDERICKE DECKER, of Delaware, in the county of Delaware and State of Ohio, have invented certain new and useful Improvements in Seed-Harvesters; and I do hereby declare that the following is a full, clear, and exact description thereof, reference being had to the accompanying drawings and to the letters of reference marked thereon, which form a part of this specification.

The nature of my invention consists in the arrangement of the adjustable crank-shaft, in combination with such other devices as will be hereinafter set forth.

In order to enable others skilled in the art to which my invention appertains to make and use the same, I will now proceed to describe its construction and operation, referring to the annexed drawings, in which—

Figure 1 is a side view, and

Figure 2, a plan view of my machine.

A represents the box, having, at its front end, the stripper or harvester B, and above the same the cylinder C, provided with teeth $a\ a$, set in spiral form.

The wheels D D are placed on axles, adjusted in slotted plates E E, and one of said wheels is provided with a cog-wheel, G, which operates a pinion, $b$, on the journal of the cylinder C.

All these parts are fully described in my former patent, and need no further description here.

The cog-wheel G also gears with a wheel, H, attached to the end of a crank-shaft, I, which runs across the box A, and has two arms or pitmen J J attached to it.

These arms or pitmen run back and forward, and are fastened to two other arms, K K, attached to the rake-head L.

The rake-head L extends clear across the box A, and in moving forward rests upon two pivoted ways $d\ d$, the rear ends of which rest upon inclined stationary guides $e\ e$. When the rake has been moved forward it drops down from the ways $d\ d$ and is brought back under them and up the inclined guides $e\ e$, until the rear ends of the ways $d\ d$ have been raised to let the rake pass, and dropped down again on the guides, when the rake moves forward again on said ways. During its backward movement, the rake carries off the chaff from the cylinder C, and packs it in the box.

The crank-shaft I has its bearings in two slotted plates $f\ f$, attached by means of screws $i\ i$, one on each side of the box A. By this means the said crank-shaft, with its wheel H, can be readily adjusted to suit the adjustment of the driving-wheels.

Having thus fully described my invention,

What I claim as new, and desire to secure by Letters Patent, is—

The combination of the adjustable crank-shaft I, with its wheel H, pitmen J J, and arms K K, all constructed and arranged as described, for operating the rake L, substantially as herein set forth.

In testimony that I claim the foregoing as my own, I affix my signature in presence of two witnesses.

FREDERICKE DECKER.

Witnesses:
T. E. POWELL,
F. M. JOY.